J. A. Fry
Bench Plane.

No. 7938.  Patented Feb. 18, 1851.

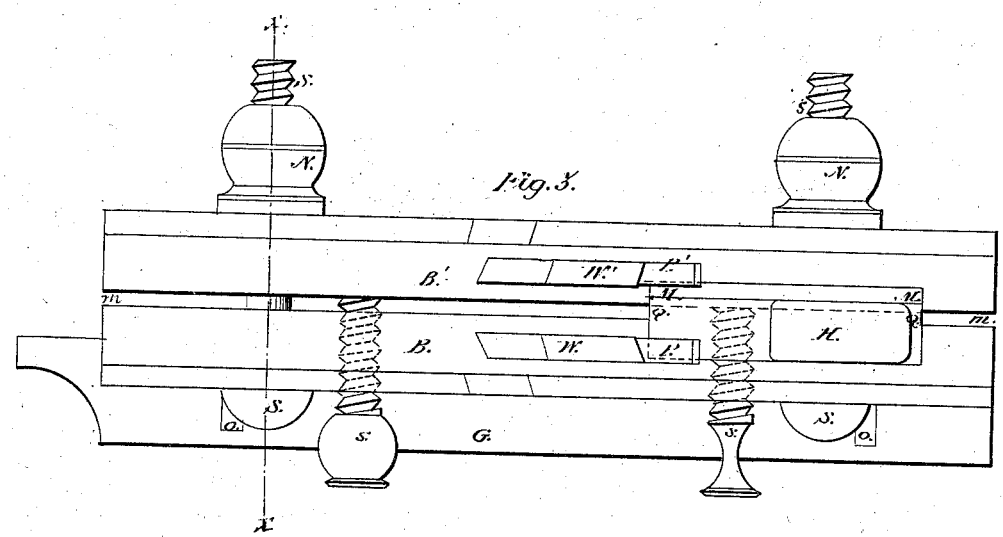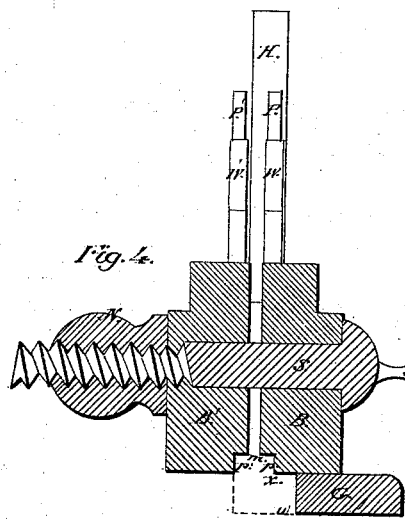

UNITED STATES PATENT OFFICE.

JOHN A. FRY, OF EDINBURG, VIRGINIA.

TOOL FOR TONGUING, JOINING, AND RABBETING.

Specification of Letters Patent No. 7,938, dated February 18, 1851.

*To all whom it may concern:*

Be it known that I, JOHN A. FRY, of Edinburg, county of Shenandoah and State of Virginia, have invented a new and useful Tonguing Plane, and that the following is a full, clear, and exact description thereof, reference being had to the accompanying drawings, which make part of this specification.

The purposes of my invention are to make a tool by the use of which the workman may make tongues of different thicknesses, the same tool being capable of both tonguing and jointing the stuff, and to make the same tool answer the purpose of a rabbeting plane. The tool might be called a combined jointing-tonguing and rabbeting plane. The advantage of such a tool is that boards or plank of different thicknesses may be tongued with one implement, and yet each may have a tongue cut upon it of a thickness adapted to that of the plank. It also enables the workman to diminish the thickness of any tongue if found too thick for the easy putting together of his work. It also saves the trouble of keeping on hand or carrying about three distinct tools instead of one, to perform the three or four operations for which this implement is intended.

Figure 1:
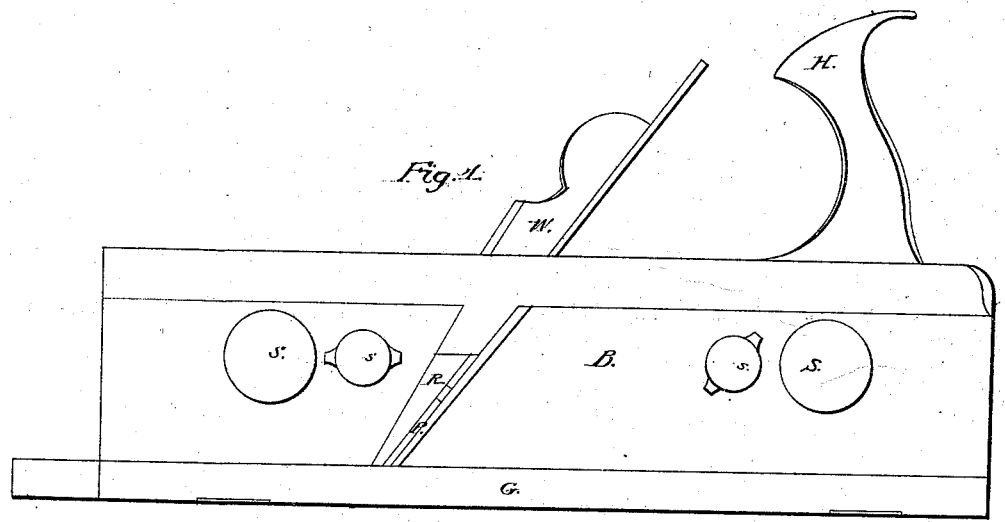
Figure 2:
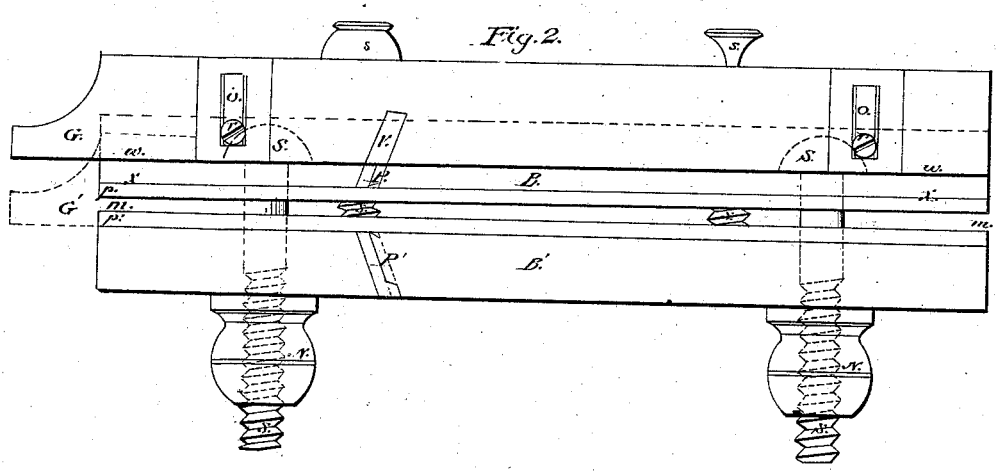

My plane is made of two distinct parts or bodies B and B′, Figures 2 and 3; wherein, Fig. 2, is an underside plan and Fig. 3 a top plan. These parts may, by turning back the screws s, s, and screwing up the nut N, N, on the screws S, S, be brought close together, closing up the space m m between the two bodies. When the bodies are thus brought together, the instrument may be used first to joint a board, which it will do if the adjustable guide or gage G, Fig. 2, be brought into the position indicated by the dotted lines, G′. This position it can take by slackening the set screws r r, and slipping the gage piece till the screws occupy the opposite ends of the slots o, o, to those where they are seen in the figure. The plane iron P′ will then serve as a jointing cutter to straighten the edge of the board before commencing the tonguing, the board resting on its edge for both operations. When a tongue is to be cut, after jointing the board, the slide or gage G is restored to the position seen in the figure (2) or so nearly to it as is required by the thickness of the plank. The two bodies B, B′ may then be either kept close together or they may be separated apart to a distance required by the thickness of the tongue intended to be formed. If they be kept close together the thickness of the tongue will be that of the two half grooves P, P′, but if they be separated by the adjusting screws s s, and fixed by the set screws S S, then will the thickness of the tongue be increased by the distance m of the separation of the two bodies. At whatever distance apart the bodies are set the guide or gage G, sliding along the face of the board determines the breadth of cut which shall be made by the cutter P. The cutters P and P′ are both set inclined not only backward from the vertical, but also horizontally from their inner to their outer edges respectively. By this arrangement of the irons the chips or shavings are, when tonguing, thrown outward on the two opposite sides of the plane. The place of discharge is seen at R, in the side elevation of the body B, Fig. 1. The cutters P and P′ are held in place by the oblique wedges W and W′ Figs. 1 and 3.

The cutters have each two edges, one across the end and one on the inner side, whereby the side of the tongue is smoothed at the same time that the wood is cut away on both sides of it to form the jointed shoulders of the tongue. The edges along the sides also serve the purpose of diminishing the thickness of a tongue already made when such diminution becomes necessary.

The handle of the plane is seen at H, Figs. 1 and 3. It is permanently attached to the body B, but its base Q Q (Fig. 3) extends beyond that body and makes a projection which enters a notch M M, in the upper part of the body B′, which notch and projection serve to give a support in a longitudinal direction to the body B′ while the set screws S S confine it laterally to the body B.

When the plane is to be used for rabbeting the body B′ is wholly removed and the set screws S S may be taken out. Then by sliding the guide G on the set screws r r, till the edge w w coincides with or lies over x x, it may be then fastened for the purpose of using the plane to joint a board previous to cutting a rabbet. The plane iron P is driven down till its cross edge comes nearly or quite through the oblique slot V. The edge of the gage G together with the vertical side of the notch P, then serves as the face of the jointer, and the jointing cut is made not by the cross edges but by the side edge of the plane iron P. With the implement having its gage and cutter in the positions just described the board is jointed on its edge while it lies upon its face or flat side, the bottom of the notch or rabbet $p$ resting upon the upper corner of the board and guiding or sustaining the plane.

The board having been jointed, is rabbeted without removing it from the bench. For this purpose, the tool is prepared by sliding the gage $G^1$ into the position represented by the plain lines in Fig. 2, and the plane iron is set with its cross edge nearly on a level with the line $x$ $x$, descending only far enough below that level to make its cut.

It is then used to cut the rabbet without changing the position of the board, from that in which it lay while being jointed.

From the foregoing description it will be seen that the gage G is brought into use in combination with the notch P and the side edge of the cutter P to form a jointer for a board resting on its face, in a situation to be rabbeted; that it is combined with the cross edge of the cutter P and with the half groove $p$ to form the rabbeting plane; that when combined with the cutter P' and the body B' it forms a jointing cutter to joint a board, set up edgewise in a position to be tongued, and finally that the same gage G in combination with the two bodies B and B', and the two cutters P and P', it forms the tonguing plane. The parts of the tonguing plane just specified, together with the parts hereinbefore specified for setting the bodies B and B' asunder and retaining them in place constitute an adjustable tongue cutter, whereby tongues may be cut of different thicknesses to suit the thickness of the stuff or the purpose to which it is to be applied.

Fig. 4 is a cross section through $x$ $x$ Fig. 3, exhibiting the bodies B and B' the gage G, the fastening screw S and its nut N together with an elevation of the wedges W, W', plane irons P and P' and the handle H.

What I claim as my invention and desire to secure by Letters Patent is—

1. So making a jointing, tonguing and rabbeting plane that the jointing and tonguing of a board while resting on its edge, and also the jointing and rabbeting of it while it lies on its flat side may all be performed with one planing tool in the manner substantially as herein described, and for the purposes herein set forth.

2. I also claim making the tonguing hand plane in such a manner as to enable the workman to make therewith tongues of various thicknesses substantially in the manner herein set forth, whereby I prevent the necessity of providing different tools to tongue planks of different thicknesses.

3. I also claim in combination with a divided body or plane stock, the two cutters having each a cross-cutting and a side-cutting edge and the means substantially as herein described for adjusting the distance apart of the two cutters and bodies whereby the plane is made capable of dressing the sides of a tongue to any desired thickness and at the same time to cut the shoulders as herein specified.

4. I also claim in combination with the gage G the use of the body B' and the cross edge of the cutter P' to constitute a jointer to straighten the edge of a board preparatory to tonguing it and while resting on its edge in a situation to receive the tonguing.

5. I also claim the gage G in combination with the notch $p$ and the side edge of the cutter P, acting as herein described, as a jointing plane to straighten the edge of a board or plank resting on its flat side, in a position to have a rabbet cut in the manner substantially as herein set forth.

JOHN A. FRY.

Witnesses:
 GEORGE A. GRUNDSTAFF,
 ISAAC RULY.